Patented Apr. 26, 1938

2,115,413

UNITED STATES PATENT OFFICE 2,115,413

ACYL ARYL COMPOUNDS

Miles Augustinus Dahlen and Newell Meade Bigelow, Wilmington, and Frithjof Zwilgmeyer, Arden, Del., assignors to E. I. du Pont de Nemours & Company, Wilmington, Del., a corporation of Delaware No Drawing. Application December 20, 1935, Serial No. 55,411

5 Claims. (Cl. 260—124)

This invention relates to the manufacture of new compounds having particular use as intermediates for dyestuffs.

In a recently filed application, Dahlen et al., filed September 20, 1934, Serial Number 744,786, there was disclosed a new series of dyestuffs which, when applied from a developing bath, gave excellent colors despite the fact that none of the components nor the dyestuff was substantive.

It is an object of this invention to develop new intermediates applicable to the making of azo dyes. Another object of the invention is to prepare the new compounds by methods which are economically and technically satisfactory. Other objects of the invention will be in part apparent and in part more fully hereinafter set forth.

The objects of the invention are accomplished, generally speaking, by the manufacture of compounds of the following formula, which are to the best of our knowledge and belief new:

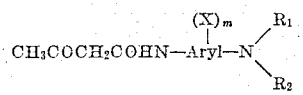

in which X is hydrogen or an auxochrome, preferably an n-auxochrome, $m$ is an integer at least 3 less than the number of carbon atoms in Aryl, $R_1$ represents one of a group consisting of hydrogen or carbon of the group consisting of alkyl, aryl, and aralkyl, $R_2$ represents carbon of one of the group consisting of alkyl, aryl, aralkyl, and acyl, and in which $R_1$ and $R_2$ may be carbon atoms of one heterocyclic ring. The auxochromes are divided into two groups of which the first, called n-auxochromes, consisting of the group alkyl, alkoxy, halogen, aryloxy, aralkyl, aralkoxy, aryl, hydroaryloxy, and trifluoro alkyl, does not tend to water-solubilize the resulting compound, and of which the second, including the carboxylic, and sulfonic acid groups tends to make the compound water-soluble. The acyl radicals are preferably of the aliphatic, aromatic, hydroaromatic or heterocyclic series. In the preferred form of this invention the aryl nucleus will not contain a water-solubilizing group and it is only in the relatively rare instances when a water-soluble compound is desired that a water-solubilizing radical will be attached to the intermediate.

The new compounds may be prepared by a number of reactions whose nature is understood by persons skilled in organic chemistry. In one of these methods, constituting a preferred process in this instance, an aromatic diamine, one of whose amino groups carries the desired substituents, and the other of whose amino groups is free to react, is added slowly to hot aceto-aceticester either by itself or mixed with an inert diluent. Condensation takes place with the elimination of ethyl alcohol and the product may be isolated by any satisfactory process. In another method a diamine carrying a selected substituent group if desired is mixed with acetoacetic-ester in the cold and the mixture is rapidly raised to about 150° C. In yet another process reaction is caused between quantities of an aromatic amine and cyclo-butadione (ketene dimer), the reaction proceeding most desirably when the quantities of the reagents are chemically equivalent.

The invention will be more completely comprehended by reference to the following examples in which parts are by weight, and which illustrate but do not limit the invention.

EXAMPLE I

2-acetyl-amino-aceto-acetanilide

This reaction was carried out in a vessel equipped with agitation, means for the addition of solids or liquids, a thermometer, and a steam-jacketed reflux condenser, by means of which all vapors of high-boiling liquids could be condensed and returned to the system, while the alcohol formed during the course of the reaction was allowed to escape.

Five parts of aceto-acetic-ester were heated to 160° C. To this hot solution one part of orthoamino-acetanilide was added. The temperature of the reaction mixture was brought back to 150° C. as rapidly as possible, and held at this point for 15 minutes. On cooling, 1 part of 2-acetyl-amino-aceto-acetanilide crystallized from the reaction mixture. After recrystallization from boiling ethyl alcohol, the product melted at 127–129° C. The product had the formula:

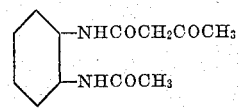

Example II

1-aceto-acetyl-amino-2-acetyl-amino-naphthalene

A mixture of 60 parts of aceto-acetic-ester and 1 part of pyridine was heated to 150° C. in the apparatus described in the previous example. 8 parts of 1-amino-2-acetyl-amino-naphthalene was added to the mixture, and the temperature of the mixture was brought back to 150° as rapidly as possible. The solution was held at this temperature for 15 minutes. On cooling, approximately 6 parts of 1-aceto-acetyl-2-acetyl-amino-naphthalene crystallized out. The purified product melted at 188–190° C., with decomposition. The product had the formula:

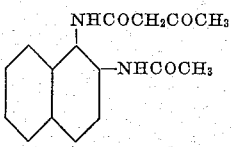

Example III

3-dimethyl-amino-aceto-acetanilide

A solution of 50 parts of 3-amino-dimethyl-aniline in 100 parts of xylene was added over the course of 20 minutes to 150 parts of aceto-acetic-ethyl-ester, the temperature of the reaction mixture being held at 150° C., throughout the addition. When all of the amine had been added, the solution was heated at 150° for 10 minutes more, and was then cooled. The mixture was freed of xylene and excess aceto-acetic-ester by a steam distillation. The residue then was slurried with dilute aqueous sodium-hydroxide for an hour. Upon separation and acidification of the aqueous phase, a small amount of 3-dimethyl-amino-aceto-acetanilide separated out as a dark viscous oil. The product had the formula:

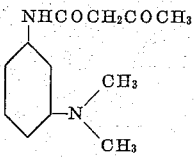

Example IV

3-methoxy-4-acetyl-amino-aceto-acetanilide 20 parts of 2-acetyl-amino-5-amino-anisole were added in small portions over the course of a half hour to a refluxing mixture of 29 parts of aceto-acetic-ester and 30 parts of xylene. The crude product which separated out on cooling was filtered, stirred for an hour with an excess of sodium-hydroxide solution, clarified, and reprecipitated by acidification of the solution. 20 parts of 3-methoxy-4-acetyl-amino-aceto-acetanilide, melting at 166–167° C., was obtained. The product had the formula:

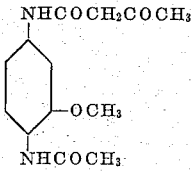

Example V

4-acetyl-amino-2,5-dimethoxy-aceto-acetanilide 1 part of 4-amino-2,5-dimethoxy-acetanilide was added in small portions over the course of one-half hour to a refluxing mixture of 2 parts of aceto-acetic-ester and 2 parts of xylene, to which a small amount of pyridine had been added. After the amine all had been added, the mixture was refluxed for a half hour and then chilled. The crude product was filtered off and subjected to a treatment with alkali, as described in the previous example. About 1 part of the pure product, melting at 209–210° C., was obtained. The product had the formula:

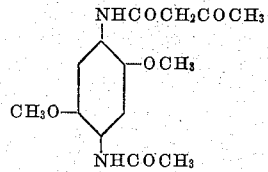

Example VI

3-methyl-4-benzoyl-amino-aceto-acetanilide 1 part of 3-methyl-4-benzoyl-amino-aniline was added in two equal portions, 15 minutes apart, to a refluxing mixture of two parts of aceto-acetic-ester and 2 parts of xylene. The solution was refluxed for 10 minutes after the second addition of the amine. The crude product which separated out on cooling was filtered from the reaction mixture and recrystallized from boiling ethyl alcohol. The yield was roughly 0.8 part of product melting at 150–151° C. The product had the formula:

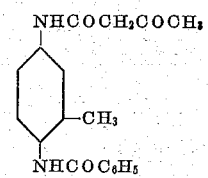

Example VII 1 part of 4-furoyl-amino-2,5-diethoxy-aniline was added in small portions to three parts of aceto-acetic-ester. The temperature of the reaction mixture was maintained at 150° C. during the addition, and held at this temperature for 10 minutes when the addition was complete. The crude product which separated out from the reaction mixture on cooling was recrystallized from boiling ethyl alcohol. Approximately 40% of the theoretical yield of the product was obtained. It melted at 168–171° C. The product had the formula:

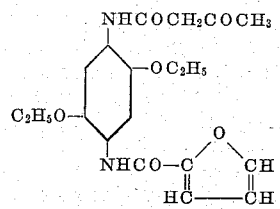

Example VIII

4-carbo-methoxy-amino-2,5-diethoxy-aceto-acetanilide

A mixture of 1 part of 4-carbo-methoxy-amino-2,5-diethoxy-aniline with 2 parts of aceto-acetic-ester was heated to 150° C. as rapidly as possible, and held at this temperature for a half hour. The crude product crystallized out on cooling, and was filtered from the reaction mixture. The product, after recrystallization from hot xylene, amounted to 50% of the theoretical yield and melted at 187–189° C. The product had the formula:

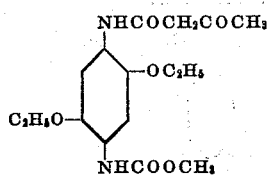

Example IX

*Aceto-acetyl-para-phenyl-amino-aniline*

A solution of 2 parts of para-amino-diphenyl-amine in 2.5 parts of warm xylene was added over the course of 20 minutes to a refluxing mixture of 1 part of aceto-acetic-ester with 1 part of xylene. The heating was continued for 15 minutes, and the reaction mixture was chilled and run into 10 parts of 10% sodium-hydroxide solution. After an hour's stirring, the aqueous layer was separated, clarified and neutralized with hydrochloric-acid. After recrystallization from boiling ethyl alcohol the product melted at 88–90° C. The yield was approximately 50% of the theory. The product had the formula:

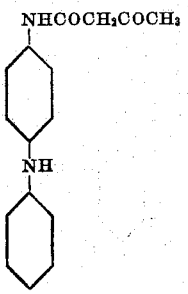

Example X

*4-(4'-ethoxy-phenyl-amino)-aceto-acetanilide*

1 part of 4-amino-4'-ethoxy-diphenylamine, dissolved in 4 parts of hot xylene, was added over the course of a half-hour to 1.5 parts of aceto-acetic-ester. The temperature of the reaction mixture was maintained at 150° C. When the addition was complete, the reaction mixture was refluxed for 20 minutes more. The xylene and excess aceto-acetic-ester were removed by a steam distillation. The residue was agitated for an hour with an excess of sodium-hydroxide solution. The crude product was recovered by acidification of the aqueous layer, and was purified by recrystallization from boiling ethyl alcohol. The pure product melted at 122–123° C. The product had the formula:

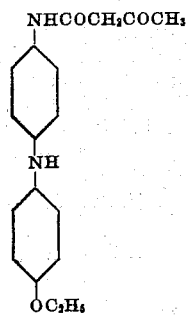

Example XI

*4-dimethyl-amino-aceto-acetanilide*

A solution of 1 part of para-amino-dimethyl-aniline in 2 parts of xylene was added slowly to 5 parts of aceto-acetic-ester. The temperature of the reaction mixture was maintained at 150° C. during the addition, and for a further period of one-half hour. The crude product, filtered from the cooled reaction mixture, was recrystallized from boiling ethyl alcohol. The pure product melted at 109–111° C. The product had the formula:

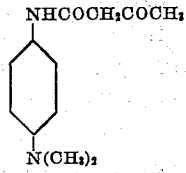

Example XII

*4-ethyl-benzyl-amino-aceto-acetanilide*

A solution of 1 part of para-amino-ethyl-benzyl-aniline in 3 parts of xylene was added over the course of a half hour to 4 parts of aceto-acetic-ester at 150° C. The reaction mixture was steam distilled; the residue was taken up in xylene and extracted with an excess of sodium-hydroxide solution. Upon acidification of the clarified aqueous layer, the crude product separated out as an oil which crystallized after several days' standing. After recrystallization from boiling ethyl alcohol, the product melted at 73–76° C. The product had the formula:

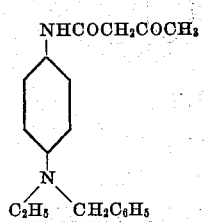

Example XIII

*Aceto-acetyl-4-(N-methyl-phenyl-amino)-aniline*

A solution of 1 part of para-amino-diphenyl-methylamine in xylene was added over the course of a half hour to a refluxing solution of 2 parts of aceto-acetic-ester and 2 parts of xylene. The product, isolated by steam distillation, alkaline extraction and reacidification, separated as an oil which could not be recrystallized. The product had the formula:

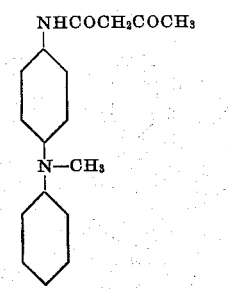

Example XIV

*Para-aceto-acetyl-amino-phenyl-morpholine*

1 part of para-amino-phenyl-morpholine was added in small installments to a refluxing solution of 2 parts of aceto-acetic-ester and 1.5 parts of xylene over the course of a half hour. On cooling, the crude product separated from the reaction mixture. The crude product was purified by recrystallization from ethyl alcohol. The product melted at 146–147° C., and had the formula:

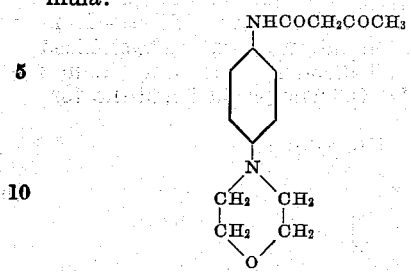

Example XV

3-chloro-4-aceto-acetyl-amino-phenyl-morpholine 1 part of 3-chloro-4-amino-phenyl-morpholine was added in small installments to 4 parts of aceto-acetic-ester at 150° C. The solution was heated in all for 1 hour, and then was chilled. The crude product was purified by solution in alkali and recrystallized. The purified product melted at 165–167° C. The product had the formula:

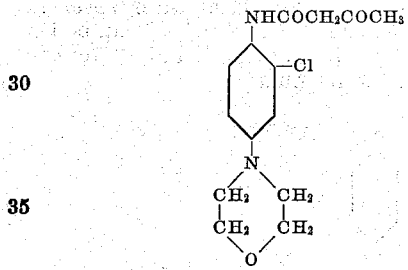

Example XVI

4-aceto-acetyl-amino-2,5-diethoxy-phenyl-morpholine 1 part of 4-amino-2,5-diethoxy-phenyl-morpholine was mixed with 100 g. of aceto-acetic-ester and heated as rapidly as possible to 150° C. The mixture was held at this temperature for one-half hour, and then was chilled. The crude product, which crystallized out on cooling, was purified by recrystallization from ethyl alcohol. The product was obtained in 53% yield, and melted at 137–139° C., having the formula:

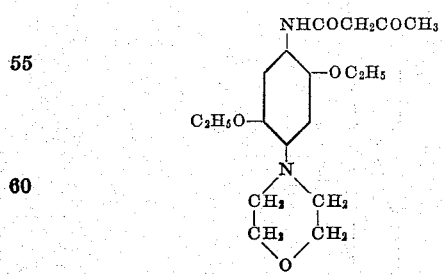

Example XVII

N-(4-aceto-acetyl-amino-phenyl)-piperidine

A solution of 1 part of 4-amino-phenyl-piperidine in 8 parts of xylene was added over the course of a half hour to 3 parts of aceto-acetic-ester at 140–150° C. The reaction mixture was refluxed for a further 10 minutes and then was cooled. The crude product was filtered off and recrystallized from ethyl alcohol. The product weighed 36% of the theory and melted at 131–132° C., having the formula:

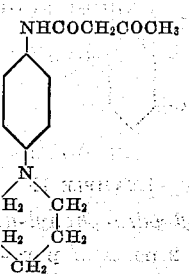

Example XVIII

N-(2,5-diethoxy-4-aceto-acetyl-amino-phenyl)-piperidine 1 part of 2,5-diethoxy-4-amino-phenyl-piperidine was added to a mixture of 3 parts of aceto-acetic-ester and a small amount of pyridine, and the mixture was heated to 150° C. as rapidly as possible. This temperature was maintained for one-half hour. The reaction mixture then was chilled. The crude product was purified by recrystallization from ethyl alcohol. The purified product weighed 45% of the theory, and melted at 106–108° C. The product had the formula:

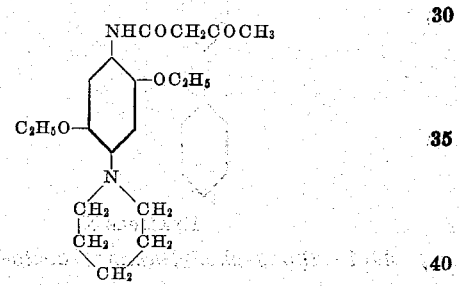

In the method of preparing amino-substituted aceto-acetanilide in which the reaction is between an ester of aceto-acetic-acid and an aromatic diamine containing one free amino group the yield is better if the amine is added to the hot ester in such a manner that an excess of the ester is present, but this condition does not uniformly prevail and modification in the order of the addition of the reagents does not alter the principal result. Catalysts may be used and in some instances desirable results are obtained by their use. Many other modifications of the invention will occur to persons skilled in the art and all such are regarded as within the scope of the invention.

As many apparently widely different embodiments of the invention may be made without departing from the spirit and scope thereof, it is to be understood that we do not limit ourselves to the specific embodiments thereof except as defined in the appended claims.

We claim:

1. The product represented by the formula

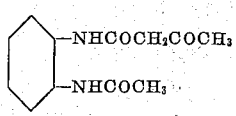

2. The method which comprises heating about 5 parts aceto-acetic-ester to about 160° C., adding thereto about 1 part ortho-amino-acet-anilide, heating the mixture at about 150° C. for about 15 minutes, precipitating the product by cooling, and recrystallizing it from ethyl alcohol.

3. The method which comprises heating a mixture containing aceto-acetic-ester and ortho-amino-acetanilide at about 150° C., and isolating the product.

4. In the process of making amino-substituted aceto-acetanilides the step which comprises mixing ortho-amino-acetanilide with hot aceto-acetic-ester, and retaining the mixture in a heated condition until an amino-substituted compound is formed which will precipitate upon cooling.

5. In the process of making amino-substituted mono-aceto-acetanilides, the step which comprises mixing ortho-amino-acetanilide with hot aceto-acetic-ester, said ester being in excess of an equimolecular proportion.

MILES AUGUSTINUS DAHLEN.
          NEWELL MEADE BIGELOW.
          FRITHJOF ZWILGMEYER.